United States Patent [19]

Rosene et al.

[11] Patent Number: 5,682,782
[45] Date of Patent: Nov. 4, 1997

[54] WORKPIECE-DEFORMING TOOL AND DIE FOR USE IN A PUNCH PRESS

[75] Inventors: Ronald G. Rosene, Coon Rapids; John H. Morehead, White Bear Lake; Richard L. Timp, Vadnais Heights, all of Minn.

[73] Assignee: Wilson Tool International, Inc., White Bear Lake, Minn.

[21] Appl. No.: 686,156

[22] Filed: Jul. 24, 1996

Related U.S. Application Data

[62] Division of Ser. No. 177,691, Jan. 12, 1994, Pat. No. 5,555,759.
[51] Int. Cl.$^6$ ....................................... B21D 5/14
[52] U.S. Cl. ................... 72/179; 72/182; 72/226; 72/442; 83/549
[58] Field of Search ............... 72/175, 179, 182, 72/226, 442, 164, 165; 83/549; 483/28, 29

[56] References Cited

U.S. PATENT DOCUMENTS

| | | |
|---|---|---|
| 1,199,715 | 9/1916 | Schmidt . |
| 1,837,629 | 12/1931 | Newton . |
| 2,341,215 | 8/1944 | Hackbarth . |
| 2,364,735 | 12/1944 | McGlone et al. ............ 72/179 |
| 2,486,147 | 10/1949 | Fuller . |
| 2,832,395 | 4/1958 | Fisher ........................ 72/175 |
| 3,053,304 | 9/1962 | MacNaughton et al. . |
| 3,184,942 | 5/1965 | Cookson . |
| 3,203,214 | 8/1965 | Fraenkel . |
| 3,318,130 | 5/1967 | Sendzimir ................... 72/226 |
| 3,333,451 | 8/1967 | Inlow . |
| 3,683,663 | 8/1972 | Diolot . |
| 3,938,362 | 2/1976 | Falk et al. .................... 72/225 |
| 4,048,830 | 9/1977 | Elsener ........................ 72/175 |
| 4,299,643 | 11/1981 | Cross . |
| 4,665,607 | 5/1987 | Ressencourt ................ 29/568 |
| 4,689,261 | 8/1987 | Ahnström . |
| 4,726,210 | 2/1988 | Weil et al. ................... 72/133 |
| 5,107,695 | 4/1992 | Vandenbroucke ........... 72/129 |
| 5,156,034 | 10/1992 | Lorbach ...................... 72/20 |
| 5,575,168 | 11/1996 | Rosene et al. ............... 72/179 |

FOREIGN PATENT DOCUMENTS

| | | | |
|---|---|---|---|
| 1040081 | 10/1953 | France ........................ 72/175 |
| 2117489 | 10/1971 | Germany .................... 72/164 |
| 585733 | 10/1993 | Germany .................... 72/210 |
| 1281372 | 1/1962 | Japan . |
| 289901 | 12/1986 | Japan ......................... 72/179 |
| 34622 | 2/1987 | Japan ......................... 72/164 |
| 2247021 | 10/1990 | Japan . |
| 5-42333 | 8/1991 | Japan ......................... 72/446 |
| 5042333 | 2/1993 | Japan . |
| 5245544 | 9/1993 | Japan . |

*Primary Examiner*—David Jones
*Attorney, Agent, or Firm*—Fredrikson & Byron, P.A.

[57] ABSTRACT

A punch press is provided with a tool bearing a workpiece-deforming roller, the tool being received in an aperture in the press for movement between a lower position in which the roller comes into deforming contact with a workpiece supported on a surface and a raised position out of deforming contact with the workpiece. Elongated deformations may be formed in a workpiece by translating the workpiece horizontally along the surface while the roller is in its lower position. A coacting roller may be provided beneath the workpiece so that the rollers come into deforming contact with opposite sides of the workpiece to deform it as the workpiece is translated between the rollers.

10 Claims, 4 Drawing Sheets

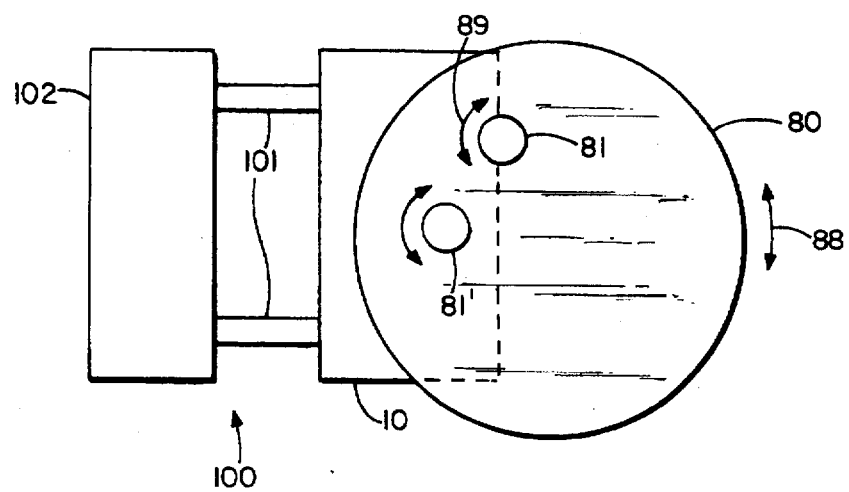
FIG. 5
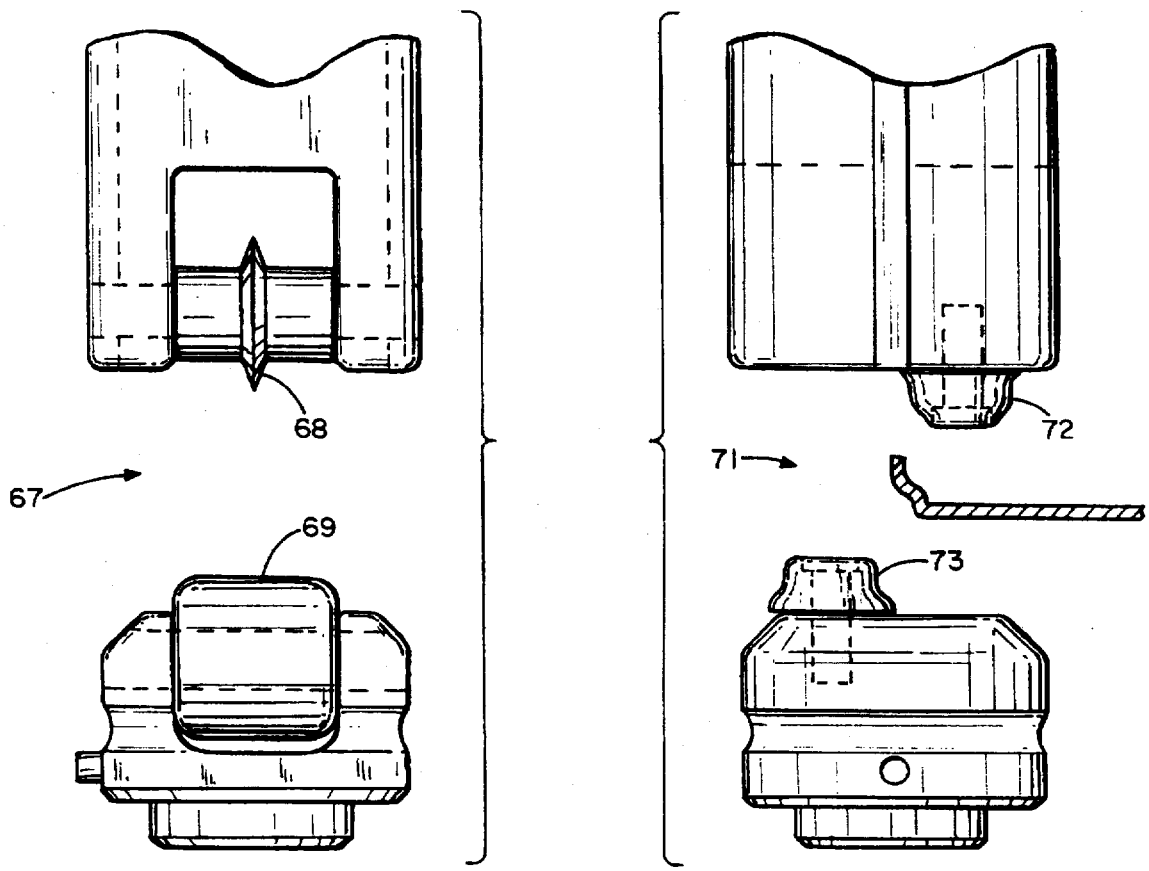
FIG. 6  FIG. 8

WORKPIECE-DEFORMING TOOL AND DIE FOR USE IN A PUNCH PRESS

This is a divisional of application Ser. No. 08/177,691, filed Jan. 12, 1994, now U.S. Pat. No. 5,555,759.

TECHNICAL FIELD

This invention relates to tool assemblies useable with punch presses in general and particularly with multiple station turret punch machines.

BACKGROUND OF THE INVENTION

Multiple station turret punch machines, such as the Amada Lyla Series Model 50-5072 provide a plurality of different punch stations for use in conjunction with a like number of opposing die cavities. Each station includes a punch unit and a corresponding die. Typically, several punch and die combinations are used in sequence to suitably shape a workpiece.

Conventional punch units have a punch guide, a punch driver, and a punch tip fixedly attached to the punch driver. The punch driver and punch tip are positioned in the punch guide for reciprocal axial movement along the longitudinal axis of the punch guide, and the guide itself is positioned within a tool-receiving aperture in a turret for reciprocal axial movement, all in a manner known to the art. Punch tips may have a variety of shapes for punching holes, cutting, and making impressions in a workpiece.

Conventional dies mate with conventional punch units. A die is fixedly positioned underneath a mating punch and receives the punch tip as it punches through a workpiece. The punch tip may have a cutting face of any desired shape, and the mating die may have a correspondingly shaped orifice so that holes of the desired shape are formed in the workpiece. If a dimple is to be formed in the workpiece, the punch may have a generally spherical convex workpiece contacting face, and the die may have a correspondingly shaped concave surface.

In general, a turret punch press includes a horizontal workpiece support surface and a mechanism for moving a workpiece in a precise and predetermined manner on the support surface. The punch press includes a punch station where the punching operation occurs, generally in the plane of the support surface. The press alto includes a turret that rotates about a vertical axis. Aligned, tool-receiving frames are carried by the turret on each side of the plane of the workpiece support surface. The upper frame usually holds a series of punches spaced circumferentially around the frame, and the lower frame holds a series of circumferentially spaced dies aligned beneath and mated to the respective punches. The punches are spring-biased upwardly and are mounted to move from their upper positions downwardly into lower, punching positions when struck by a punch press ram.

In a typical punching operation, a workpiece is clamped in a desired position on the support surface and the turret is rotated to bring a selected punch and die combination to the punch station. The punch ram is then cycled downwardly and upwardly, striking the punch on its downward stroke to drive the punch tip into a workpiece-deforming position in which the punch tip contacts the workpiece.

An elongated rib may be formed in a workpiece by making a series of dimples, moving the workpiece slightly between each dimple. Forming elongated deformations of this type using conventional punch tools is time consuming and produces excessive wear on the equipment. To create a deformation larger than the cross-section of the punch tip, the workpiece must be incrementally moved between punching operations. In fast punch presses, the ram can reciprocate several times per second. However, to create a smooth deformation in nibbling or rib-forming operations, a workpiece typically can only be moved about 1/32" after every stroke of the ram. Conventional punch tools thus may be able to form a rib at a rate of only about ⅛ inch per second. This ram of deformation prevents cost effective use of punch presses to machine curved deformations such as the raised ribs on metallic cylinder gaskets.

Additionally, when conventional punch units are so used, they tend to create small, unintentional but visible marks in elongated ribs or other impressions. The unintentional marks are roughly transverse to the longitudinal direction of the ribs so that they reduce the quality of the resulting product.

Therefore, a need exists for a workpiece-deforming tool that is used in a punch press that can quickly create a high quality elongated deformation in a workpiece.

SUMMARY OF THE INVENTION

The instant invention makes use of modified punch and die-like tooling that can be received in the tool holding frames of a turret punch press and which includes roller surfaces for deforming a workpiece. In the process of the invention, the punch does not immediately return to its upper position after being struck downward by the ram. Rather, the punch is maintained in its lower position in contact with the workpiece while the workpiece is concurrently moved in a predetermined path on the support surface. As the workpiece is moved, an elongated deformation is formed as the roller punch/die combination rolls along the workpiece.

Thus, in one embodiment, the invention provides a workpiece-deforming tool having an elongated body shaped to be received in a tool receiving aperture in a punch press for reciprocal and axial movement along the longitudinal axis of the aperture. A rotatable workpiece-deforming roller is carried by the body so that it contacts a workpiece when the body is struck by a ram. The body may include an upper end adapted to be struck by a ram and a spring seat positioned to engage a compressible spring biasing means carried by the punch press. The rotatable workpiece-deforming roller creates an elongated deformation as the workpiece is moved on the support surface while the roller contacts the workpiece in a workpiece-deforming position.

The body of the workpiece-forming tool may include a guide shaped to be received in a tool-receiving aperture and to move reciprocally along the longitudinal axis of the aperture; and a driver adapted to be struck by the ram. The driver is received in the guide so that the driver and the guide are in telescoping relationship. In this embodiment, the guide carries the rotatable workpiece-deforming roller. A compression spring positioned between the guide and the driver transmits the downward force of the ram from the driver to the guide and roller to thrust the roller against the workpiece.

A coacting rotatable workpiece-deforming roller may be carried in a die base and positioned in alignment with the roller carried by the body. The coacting roller is configured with respect to the roller carried by the body so that the rollers coact on opposite sides of a workpiece to deform the workpiece in a predetermined manner. An elongated deformation is produced by moving the roller carried by the body into a workpiece-deforming position and then translating the workpiece between the rollers.

The rollers rotate about axes that desirably are parallel to each other. The axes about which the rollers rotate are positionable at any angle relative to the axial movement of the body ranging from 90° to parallel. The rollers may have workpiece-contacting surfaces of virtually any shape. For example, a roller carried by the body may have a contacting surface with a concave U-shape, and a coacting roller may have a workpiece contacting surface with a mating upwardly convex U-shape. This combination of rollers produces an elongated deformation or rib having a U-shaped cross section. The present invention is capable of making elongated deformations of virtually any cross-sectional shape, as well as making elongated cuts in a workpiece.

In a preferred embodiment, the invention includes a turret punch press assembly having a rotating turret tool holding frame. The turret has at least one, and preferably a plurality of tool receiving apertures for receiving workpiece-deforming tools. The punch press includes a workpiece support surface that defines a plane in which the workpiece is translated, and means for translating the workpiece in this plane. The punch press also includes a ram for urging and maintaining a workpiece-deforming tool into a workpiece-deforming depressed position, and a compressible spring biasing means housed in the tool frame for biasing tools upward after the ram is released.

In a turret punch press assembly of the present invention, a workpiece-deforming tool carrying a rotatable workpiece-deforming roller is placed in a first tool receiving aperture of the tool holding frame on one side of the workpiece supporting surface. A die base carrying a coacting rotatable workpiece-deforming roller is placed in a second tool receiving aperture on the other side of the workpiece support surface. The first tool receiving aperture is generally positioned above the workpiece support surface. The coacting roller in the second aperture is positioned in alignment with the roller carried by the workpiece-deforming tool, and the rollers remain aligned with each other as the turret is rotated about a vertical axis.

A turret punch press assembly of the present invention quickly creates high quality elongated deformations by translating a workpiece between the roller carried by the body and the coacting roller carried by the die base. A ram depresses the body and its roller into the workpiece-deforming position to engage the roller carried by the body on one side of the workpiece and the coating roller carried by the die base on the opposite side of the workpiece. While the rollers are maintained in the workpiece-deforming position, as by continued downward force delivered by the ram, the workpiece is translated between the rollers.

An objective of the present invention is to improve the speed of punch press manufacturing operations by increasing the rate at which elongated deformations can be made in a workpiece. The present invention achieves a significantly higher deformation rate than conventional punches because the rollers allow continuous translation of a workpiece while the rollers are in the workpiece-deforming position. Consequently, a workpiece may be moved between the rollers without having to disengage the tool.

Another objective of the present invention is to create smooth elongated deformations by maintaining continuous contact between the workpiece-deforming tool and workpiece while concurrently drawing the workpiece through the rollers.

Yet another objective of the invention is to improve the working life of punch presses and workpiece-deforming tools. The present invention significantly reduces the number of cycles required to create an elongated deformation because a deformation can be created with only one cycle of the punch press.

These and other features of the invention will become more apparent upon reference to the following description of the preferred embodiment of the invention, and in particular, upon referring to the drawings.

BRIEF DESCRIPTION OF THE DRAWINGS

FIG. 5 is a schematic plan of a turret punch press assembly showing rotational movement of a turret and translational movement of a workpiece;

FIG. 6 is a cross-sectional view of a roller set of the invention for cutting a workpiece to create an elongated cut;

FIG. 8 is a cross-sectional view of a roller set of the invention for deforming an edge of a workpiece.

DETAILED DESCRIPTION OF THE PREFERRED EMBODIMENT

Figures 1, 2:
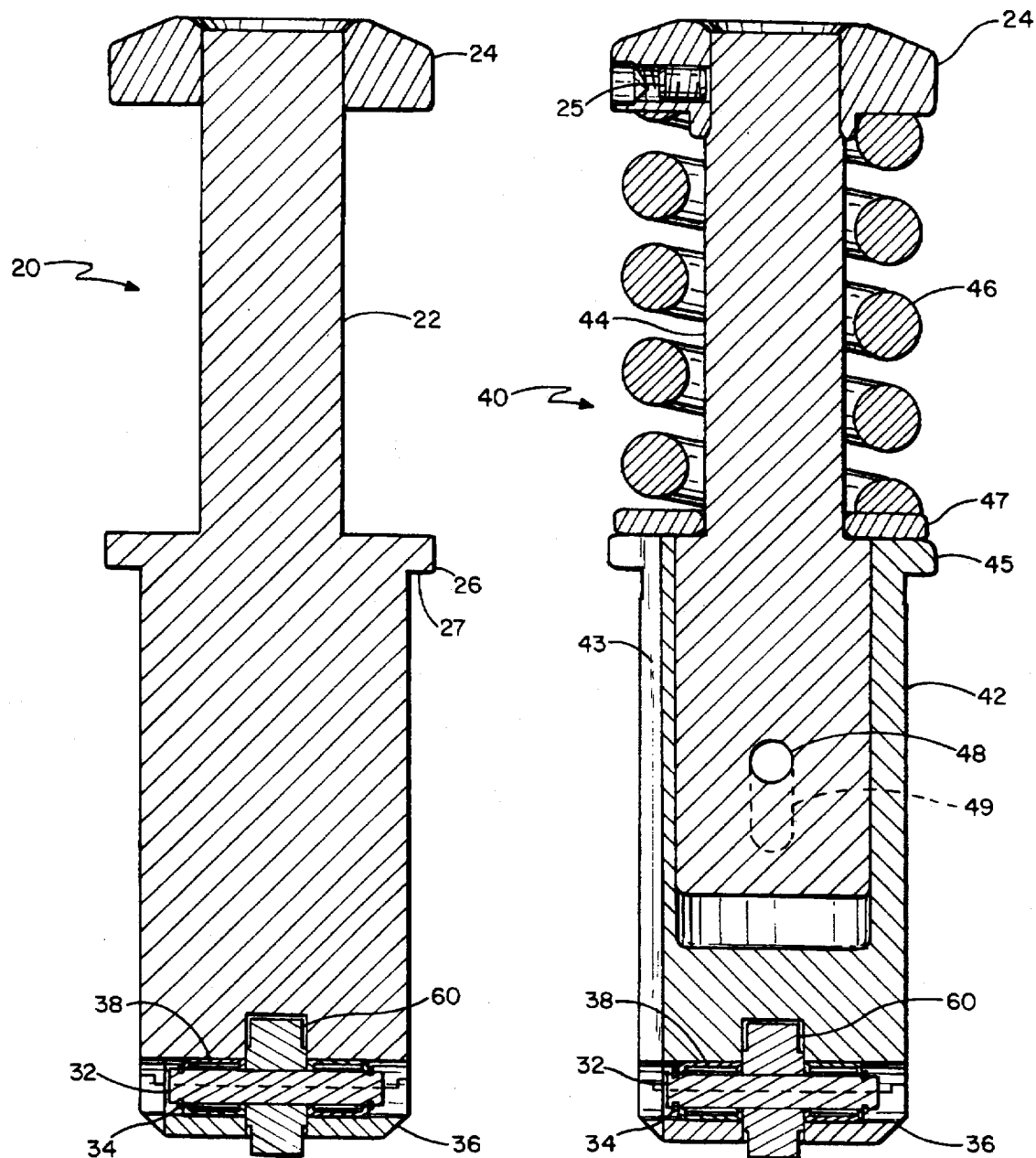
FIG. 1 is a cross-sectional view of a workpiece-deforming tool of the invention.
FIG. 2 is a cross-sectional view of another a workpiece-deforming tool of the invention.

A workpiece-deforming tool 20 embodying the invention is illustrated in FIG. 1. The tool 20 has an elongated and generally vertical body 22 that is receivable in a tool receiving aperture in a punch press for movement axially between a raised position and a workpiece-deforming depressed position. The body includes a spring seat 26 for engaging a compression spring (not shown) carried in the tool receiving aperture that acts against surface 27 to urge the body into its raised position. The body 22 includes a head 24 at its upper end that is adapted to be struck by the ram of a punch press. The body 22 also carries a rotatable workpiece-deforming roller 60 at its lower end.

As shown in FIG. 1, the roller 60 rotates around shaft 32 which is mounted in roller or pin bearings at the lower end of the body. The shaft 32 may be positioned normal to the axial motion of the body 22 as shown in FIG. 1, or any other angle relative to the axial motion of the body up to being parallel as shown in FIG. 8. The shaft 32 rotates within the bearings 38 which are held in place by retaining rings 34. The roller 60 is secured to the body 22 by a cap 36 and a cap screw (not shown).

FIG. 2 shows a modified workpiece-deforming tool 40 having an elongated and generally vertical guide 42 that is receivable in a tool receiving aperture in a punch press. A punch driver 44 is telescopically received within the guide 42. The guide 42 has a spring seat 45 for engaging a compression spring means carried by the tool receiving aperture. A keyway 43 runs along the longitudinal axis of the guide 42 for receiving a key (not shown) carried by the tool receiving aperture. The guide 42 also includes a slot 49 for receiving a dowel pin 48 that is fixedly attached to the punch driver 44.

A head 24 is fixedly attached to the driver 44 by a radial set screw 25. A compression spring 46 is captured between the head 24 and a support ring 47 borne by the spring seat 45. The spring 46 transmits the downward force of the ram from the driver 44 to the guide 42, thereby moving the guide 42 downward. A rotatable workpiece-deforming roller 60 is carried by the guide 42 in the same manner shown in FIG. 1.

As the ram of a punch press depresses the head 24, it urges the driver 44, the guide 42 and the roller 60 into the workpiece-deforming position. The dowel pin 48 may travel within the slot 49 as the spring 46 compresses the driver 44. After the ram releases the driver 44, the spring 46 urges the driver upward, and the compressible spring biasing means carried by the tool receiving aperture urges the guide 42 upward disengaging the roller 60 from the workpiece.

Figure 3:
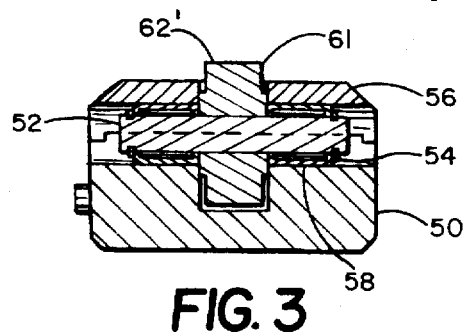
FIG. 3 is a cross-sectional view of a die base and coacting roller.

FIG. 3 shows an alternative embodiment of the invention employing coacting rollers. The die base 50 carries a coacting rotatable workpiece-deforming roller 61 in alignment with the roller 60 carried by the guide 42 shown in FIG. 2. Coacting roller 61 is carried by the die base 50 in the same manner that the roller 60 is carried by the guide 42 in FIG. 2. The coacting roller 61 rotates about a shaft 52 that is supported by at least two bearings 58. A cap 56 is attached to the die base 50 by cap screws (not shown).

The coacting roller 61 is configured with respect to the roller 60 so that the rollers continuously and concurrently deform a workpiece as it is translated between them. It will be appreciated that the rollers may have a variety of workpiece contacting surfaces 62 and 62' including, but not limited to, surfaces having an S-shape, U-shape, V-shape, W-shape, as well as continuous blades, shears, and perforating points. In some cases, the workpiece-contacting surface 62 of roller 60 may have a cross-sectional shape that generally mates with the cross-sectional shape of the work-contacting surface 62' of roller 61.

Figures 4A, 4B:
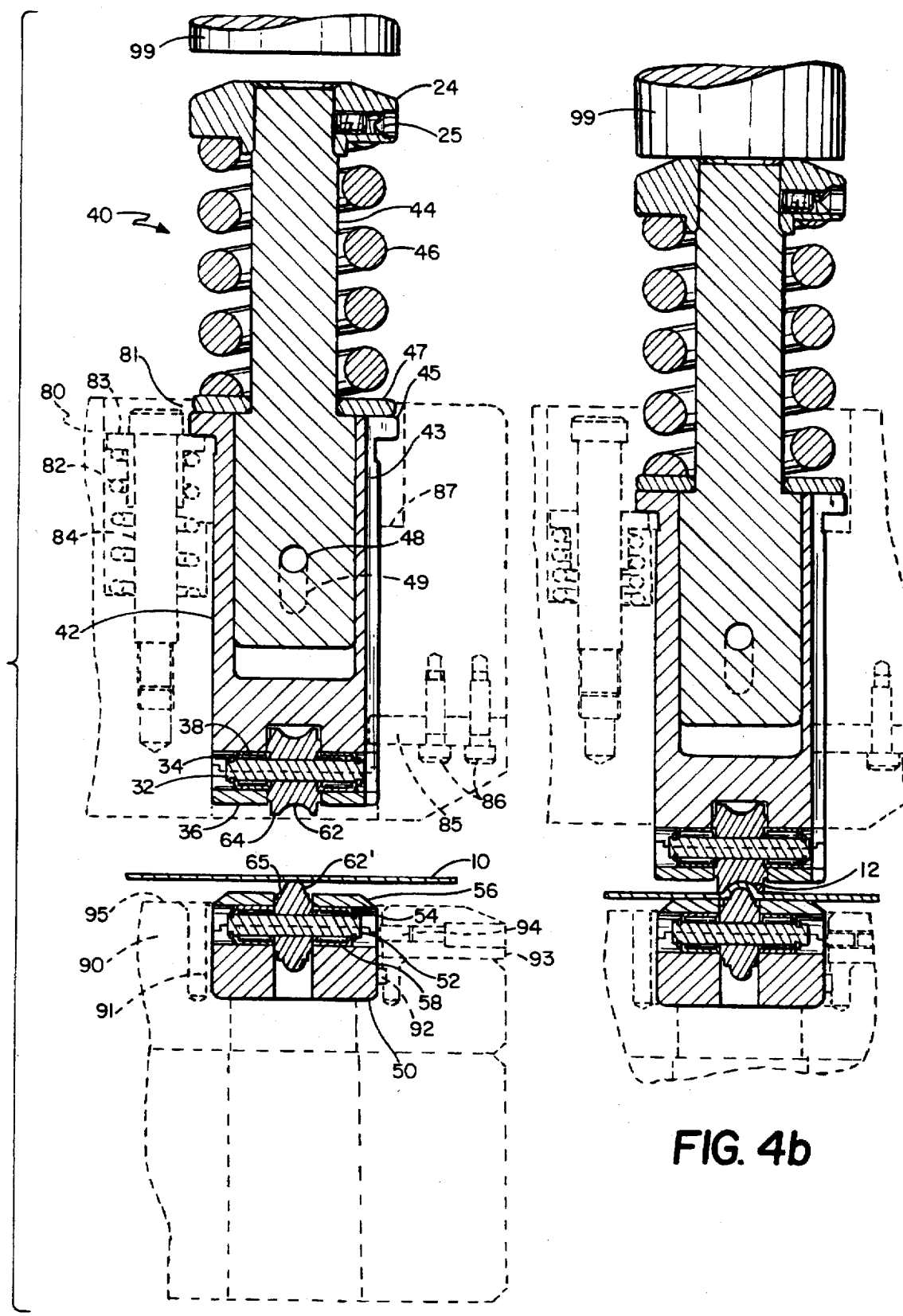
FIG. 4(a) is cross-sectional view of a turret punch press assembly in accordance with an embodiment of the invention with the rollers in a separated position.
FIG. 4(b) is cross-sectional view of a turret punch press assembly in accordance with an embodiment of the invention with the rollers in a workpiece-deforming position.

FIGS. 4a and 4b depict a preferred embodiment of the invention employing the workpiece-deforming tool 40 and a turret punch press assembly. The turret punch press assembly includes a workpiece support surface 95 that defines a plane in which the workpiece is translated, an upper rotating tool holding frame 80 positioned above the support surface 95, and a lower rotating tool holding frame 90 positioned below the support surface 95. The upper turret 80 has at least one, and preferably a plurality of first tool receiving apertures 81. The lower turret 90, includes at least one, and preferably a plurality of second toot receiving apertures 91. The upper turret 80 and lower turret 90 are each rotatable about a vertical axis so that each first tool receiving aperture 81 remains aligned with a corresponding second tool receiving aperture 91.

The deforming tool 40 is positioned in the turret frame 80 in the first tool receiving aperture 81. The guide 42 of the workpiece-deforming tool 40 moves axially within the first tool receiving aperture 81, reciprocating between an upper or raised position and a lower or workpiece-deforming position. The guide 42 is urged upward by a compressible spring biasing means carried by the turret frame 80, and exemplified in FIGS. 4a and 4b as including a series of upright pins 84 spaced circumferentially about the aperture 81, each pin having a surrounding compression spring 82 supporting an annular shoulder 83. The spring seat 45 of the punch guide is supported on the annular shoulder 83, enabling the guide to move downwardly against the pressure of the springs 82. The guide 42 maintains its position relative to the turret 80 by means of a key 85 that extends from the turret into the keyway 43 formed in the guide. Two cap screws 86 fixedly attach the key 85 to the turret 80. A rotatable workpiece-deforming roller 64 for making a raised elongated deformation having a U-shaped cross section is carried by the guide 42 in the manner described in FIG. 2. A corresponding coacting rotatable workpiece-deforming roller 65 for making a raised deformation having the same U-shaped cross section is carried by the die base 50 which is disposed in a second tool receiving aperture 91. The coacting roller 65 is positioned slightly above the workpiece supporting surface 95. A workpiece 10 may be introduced between the rotatable workpiece-deforming roller 64 carried by the guide 42 and the coacting roller 65 carried by the die base 50 when the ram 99 is not depressing the driver 44.

FIG. 4b depicts the same embodiment of the invention after the ram 99 has engaged the driver 44 and is preventing the driver from retreating upwardly. The downward pressure of the ram 99 is transmitted from the driver 44 through the spring 46 to the guide 42, thereby compressing the spring 46 slightly and permitting the roller 64 to position itself vertically against the workpiece under pressure of the spring. The spring 46 thus causes a substantially constant pressure to be maintained by the roller 64 against the workpiece 10 by allowing for some variation in workpiece thickness and in vertical ram positioning. Vertical positioning of the roller 64 may be adjusted by controlling the length of stroke of the ram and the vertical length of the roller tool assembly.

As the ram 99 holds the roller 64 in the workpiece deforming depressed position, the workpiece 10 is translated between the rollers 64 and 65 to create an elongated deformation or rib having a U-shaped cross section 12. It will be appreciated that the rate of rib formation is not limited by requiring continuous reciprocation of the tool 40 to make a series of closely spaced dimples. Instead, deformation can occur at rams as high as the linear speed of translation of the workpiece on the support surface 95.

FIG. 5 schematically shows a turret punch press assembly capable of providing a number of different punch stations and moving a workpiece in the plane defined by a workpiece support surface. The turret 80 has first tool receiving apertures 81 and 81', the latter being shown at the punching station. The turret 80 rotates to carry different tools to the punching station. The workpiece 10 is translated in the plane defined by the workpiece support surface by translating means such as the arm mechanism 100.

The mechanism 100 generally includes one, two or more arms 101 that clamp onto or otherwise fixedly attach to the workpiece 10, and a computer controlled positioning unit 102. The positioning unit, which can be of the type commonly used with punch presses, moves the workpiece so that the part of the workpiece that is to be deformed is positioned at the punching station. The positioning unit 102 divides the workpiece support surface into a grid of coordinates defined by orthogonal axes X and Y in the plane of the support surface. The positioning unit 102 moves the workpiece by moving the arms 101 along the orthogonal axes X and Y through a series of predetermined coordinates. For example, the positioning unit 102 creates a curved deformation in a workpiece by moving the arms 101 through X and Y coordinates in small increments that define an arc.

Referring to FIGS. 4a, 4b, and 5, a tool indexing unit of known design may be employed to rotate a workpiece-deforming tool 40 tool and its corresponding die base 50 as shown by directional arrows 89 in FIG. 5. The tool indexing unit may be controlled by the same computer that controls the positioning unit 102 allowing the deforming tool 40 and its corresponding die base 50 to be incrementally rotated to position the longitudinal axes of the roller mounting shafts 32 and 52 substantially normal to a tangent to the path of the deformation in the workpiece 10. By positioning the axes of shafts 32 and 52 substantially normal to a tangent of the path of the deformation in the workpiece 10, the rollers remain free to roll in the direction of the tangent.

Figure 7:
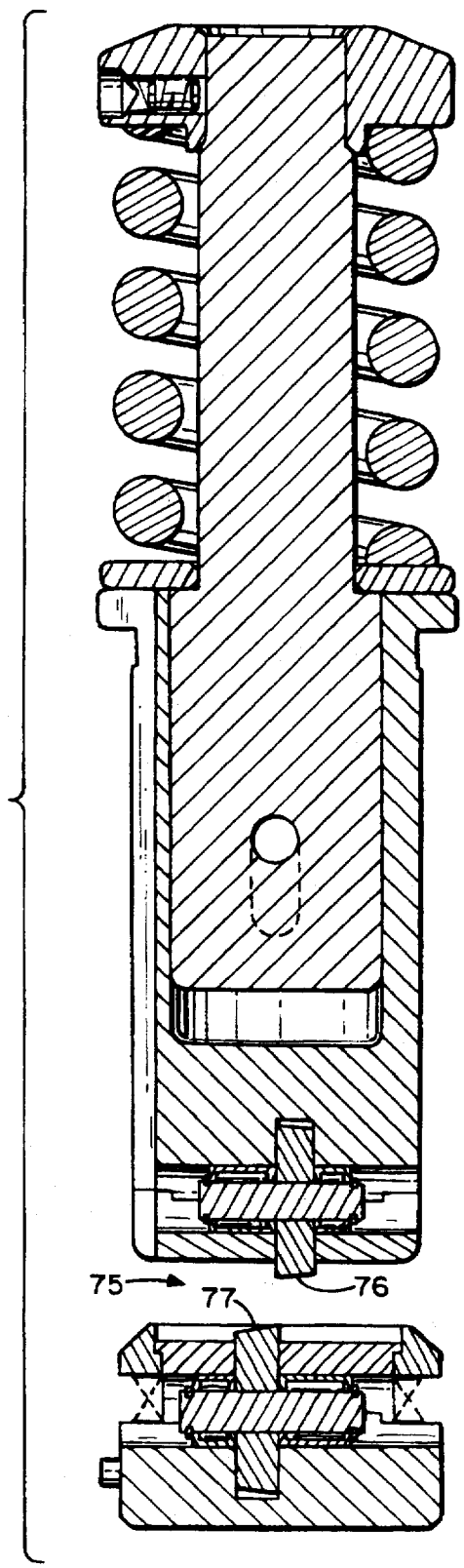
FIG. 7 is a cross-sectional view of a roller set of the invention for shear-cutting of a workpiece.

FIGS. 6–8 show a number of embodiments of the present invention having different rotatable workpiece-deforming rollers. FIG. 6 shows a roller set 67 for piercing a workpiece to make an elongated cut. In FIG. 6, a continuous blade 68 bears against a flat coacting roller 69 when the body of the workpiece-deforming tool is urged into the workpiece-deforming position. An elongated cut is formed by translating the workpiece between the rollers. This roller set is particularly useful to cut light sheet metal, or other less substantial materials such as plastic sheets or cardboard. If desired, the roller may be a punch wheel having circumferentially spaced, radially extending punch tips configured to make a series of perforation in a workpiece.

FIG. 7 depicts a roller set 75 for shearing a workpiece having two rollers 76 and 77 shaped like sharp-edged truncated cones that extend longitudinally between a first face and a second face. The first face of each roller has larger diameter than the second face. The first faces of rollers 76 and 77 are positioned so that they will be facing each other and normal to the workpiece support surface (not shown), with part of the first face of roller 76 almost contacting part of the first face of roller 77 when the rollers are in the workpiece-deforming position. As the rollers contact the workpiece, roller 76 creates a downwardly directed force and roller 77 creates an opposing upwardly directed force to shear the workpiece between the rollers. It will be appreciated that the roller set 75 works much like the blades of a scissor. Thus, two or more elongated cuts may be connected to create an elongated hole in a workpiece by using the workpiece deforming tool of the present invention.

FIG. 8 shows a roller set 71 for deforming an edge of a workpiece. A rotatable workpiece-deforming roller 72 and a coacting roller 73 rotate about axes that are parallel to the axial movement of the guide 42. The rollers 72 and 73 have mating S-shapes so that they create a deformation along an edge of the workpiece having an S-shaped cross section.

While a preferred embodiment of the present invention has been described, it should be understood that various changes, adaptations and modifications may be made therein without departing from the spirit of the invention and the scope of the appended claims.

What is claimed is:

1. A punch press assembly capable of concurrently deforming and translationally moving a workpiece, the assembly comprising a tool holding frame having at least one tool receiving aperture;

a workpiece support defining a plane in which the workpiece is translated; means for translating the workpiece in the plane;

compressible spring biasing means housed in the tool holding frame for biasing tools upward;

a workpiece-deforming tool including an elongated generally vertical body comprising an elongated generally vertical guide receivable in said aperture for reciprocal axial movement therein and an elongated generally vertical driver receivable in the guide for reciprocal axial movement in the guide, the body including a head at it upper end adapted to be struck by a ram, and a rotatable workpiece-deforming roller carried by the guide for movement between a raised position and a workpiece-deforming depressed position as the guide is reciprocated, and a spring operatively positioned between the guide and the driver for transmitting downward pressure to the guide and roller, whereby the driver, the guide and the roller carried by the guide may be urged into the workpiece-deforming depressed position, means for urging and maintaining the driver, the guide and the roller carried by the guide into the workpiece-deforming depressed position;

a die base disposed generally under the body and carrying a coacting rotatable workpiece-deforming roller so positioned and configured with respect to the roller carried by the guide as to coact therewith to continuously deform a workpiece translated on the support surface between the rollers.

2. A punch press assembly capable of concurrently deforming and translationally moving a workpiece, the assembly comprising a tool holding flame having at least one tool receiving aperture;

compressible spring biasing means housed in the tool holding frame for biasing tools upward;

a workpiece-deforming tool including an elongated generally vertical body receivable in said aperture for reciprocal axial movement therein, the body including a head at it upper end adapted to be struck by a ram, and a rotatable workpiece-deforming roller carried by the body for movement between a raised position and a workpiece-deforming depressed position as the body is reciprocated;

means for urging and maintaining the body and the roller carried by the body into the workpiece-deforming depressed position;

a die base disposed generally under the body and carrying a coacting rotatable workpiece-deforming roller so positioned and configured with respect to the roller carried by the body as to coact therewith to continuously deform a workpiece translated on the support surface between the rollers, and a workpiece support defining a plane in which a workpiece is translated, and means for translating a workpiece in said plane in a curved path so that an elongated curved deformation is created in the workpiece.

3. The punch press assembly of claim 2 including means for adjusting the length of travel of the ram to accurately position the roller carried by the body and the coacting roller carried by the die base in workpiece-conforming contact with opposite sides of a workpiece.

4. The punch press assembly of claim 2 wherein the punch press has at least one additional tool-receiving aperture, and a conventional punch received therein.

5. A punch press assembly capable of concurrently deforming and translationally moving a workpiece, the assembly comprising a tool holding frame having at least one tool receiving aperture;

compressible spring biasing means housed in the tool holding flame for biasing tools upward;

a workpiece-deforming tool including an elongated generally vertical body receivable in said aperture for reciprocal axial movement therein, the body including a head at it upper end adapted to be struck by a ram, and a rotatable workpiece-deforming roller carried by the body for movement between a raised position and a workpiece-deforming depressed position as the body is reciprocated;

means for urging and maintaining the body and the roller carried by the body into the workpiece-deforming depressed position;

a die base disposed generally under the body and carrying a coacting rotatable workpiece-deforming roller so positioned and configured with respect to the roller carried by the body as to coact therewith to continuously deform a workpiece between the rollers, and a workpiece support defining a plane in which a workpiece is translated, and means for translating a workpiece in said plane in a curved path so that an elongated curved deformation is created in the workpiece; the roller carried by the body and the roller carried by the die base being rotatable about rotational axes parallel to each other and to the plane of the support surface and wherein the body and die base have aligned vertical axes, the assembly further comprising means for simultaneously rotating the body and die base about their vertical axes to maintain said rotational axes substantially normal to a tangent to said curved path.

6. A turret punch press assembly capable of concurrently deforming and translationally moving a workpiece, the assembly comprising a workpiece support surface defining a plane in which a workpiece may be translated;

means for translating a workpiece in said plane;

a revolving turret having a plurality of first tool receiving apertures positionable above a workpiece deforming station in said plane as the turret is rotated, a plurality of second tool receiving apertures on the opposite side of said plane and aligned with the first tool receiving apertures and positionable below the workpiece deforming station as the turret is rotated, and a plurality of cooperating tool pairs received in respective aligned first and second tool receiving apertures;

compressible spring biasing means for biasing the first tools upwardly;

at least one workpiece-deforming tool including an elongated generally vertical body receivable in a first tool receiving aperture for reciprocal axial movement therein, the body including a spring seat for engaging said spring biasing means, a head at it upper end adapted to be struck by a ram, and a rotatable workpiece-deforming roller carried by the body for movement between a raised position and a workpiece-deforming depressed position as the body is reciprocated;

a ram for urging and maintaining the body and the roller carried by the body into the workpiece-deforming depressed position;

a die base receivable in said second aperture generally under the body and having a coacting rotatable workpiece-deforming roller carried in the die base, the coacting roller being positioned and configured with respect to roller carried by the body so as to coact therewith to continuously deform a workpiece translated on the support surface between the rollers.

7. The turret punch press assembly of claim 6 wherein the body further comprises an elongated generally vertical guide receivable in said first tool receiving aperture for reciprocal axial movement therein, and an elongated generally vertical driver receivable in the guide for reciprocal axial movement in the guide, the rotatable workpiece-deforming roller being carried by the guide and a spring operatively positioned between the guide and the driver for transmitting the downward pressure of the ram to the guide and roller.

8. The turret punch press assembly of claim 6 including means for adjusting the length of travel of the ram to accurately position the roller carried by the body and the coacting roller carried by the die base against opposite sides of a workpiece.

9. The turret punch press assembly of claim 6 wherein the means for translationally moving a workpiece in the plane includes means for translating a workpiece in a curved path so that an elongated curved deformation is created in a workpiece.

10. The turret punch press assembly of claim 9 wherein the roller carried by the body and the roller carried by the die base rotate about rotational axes parallel to each other and to the plane of the support surface and wherein the body and die base have aligned vertical axes, the assembly further comprising means for simultaneously rotating the body and die base about their vertical axes to maintain said rotational axes substantially normal to a tangent to said curved path.

* * * * *